(12) United States Patent
Noh

(10) Patent No.: US 11,894,511 B2
(45) Date of Patent: Feb. 6, 2024

(54) CYLINDRICAL BATTERY

(71) Applicant: LG ENERGY SOLUTION, LTD., Seoul (KR)

(72) Inventor: Soodong Noh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 165 days.

(21) Appl. No.: 17/440,636

(22) PCT Filed: Aug. 5, 2020

(86) PCT No.: PCT/KR2020/010297
§ 371 (c)(1),
(2) Date: Sep. 17, 2021

(87) PCT Pub. No.: WO2021/033959
PCT Pub. Date: Feb. 25, 2021

(65) Prior Publication Data
US 2022/0166048 A1 May 26, 2022

(30) Foreign Application Priority Data
Aug. 16, 2019 (KR) .................. 10-2019-0100469

(51) Int. Cl.
*H01M 10/052* (2010.01)
*H01M 10/058* (2010.01)
(Continued)

(52) U.S. Cl.
CPC ..... *H01M 10/0422* (2013.01); *H01M 50/152* (2021.01); *H01M 50/159* (2021.01); *H01M 50/367* (2021.01)

(58) Field of Classification Search
CPC .......... H01M 10/0422; H01M 50/152; H01M 50/159; H01M 50/367; Y02E 60/10
See application file for complete search history.

(56) References Cited

U.S. PATENT DOCUMENTS

| 6,284,404 B1 | 9/2001 | Horie et al. |
| 2006/0073375 A1 | 4/2006 | Hong et al. |
| (Continued) | | |

FOREIGN PATENT DOCUMENTS

| CN | 101512821 A | 8/2009 |
| CN | 102165624 A | 8/2011 |
| (Continued) | | |

OTHER PUBLICATIONS

Modified translation KR20090095334A as taught by Kim (Year: 2009).*

(Continued)

*Primary Examiner* — Chanceity N Robinson
*Assistant Examiner* — Tarik J Phillip
(74) *Attorney, Agent, or Firm* — Birch, Stewart, Kolasch & Birch, LLP

(57) ABSTRACT

A cylindrical battery includes a metal can, an electrode assembly mounted in the metal can, a top cap closing an upper end of the metal can, the top cap having an exhaust hole, a safety vent located at an upper end of the electrode assembly, and a gas discharge member provided in the safety vent, in which the gas discharge member includes a thin film part having at least two thin films.

16 Claims, 9 Drawing Sheets

(51) Int. Cl.
*H01M 50/375* (2021.01)
*H01M 10/04* (2006.01)
*H01M 50/152* (2021.01)
*H01M 50/159* (2021.01)
*H01M 50/367* (2021.01)

(56) References Cited

U.S. PATENT DOCUMENTS

| | | |
|---|---|---|
| 2010/0239895 A1 | 9/2010 | Yang et al. |
| 2011/0008654 A1 | 1/2011 | Kim et al. |
| 2017/0047566 A1 | 2/2017 | Okuda et al. |
| 2019/0393462 A1 | 12/2019 | Ji et al. |

FOREIGN PATENT DOCUMENTS

| | | | |
|---|---|---|---|
| CN | 109417146 A | | 3/2019 |
| CN | 110235276 A | | 9/2019 |
| JP | S48-63325 A | | 9/1973 |
| JP | S61-100405 U | | 6/1986 |
| JP | 5-205716 A | | 8/1993 |
| JP | 7-320704 A | | 12/1995 |
| JP | 9-137868 A | | 5/1997 |
| JP | 2000-58103 A | | 2/2000 |
| JP | 2002-170539 A | | 6/2002 |
| JP | 2003-197483 A | | 7/2003 |
| JP | 2011-220501 A | | 11/2011 |
| JP | 2015-141821 A | | 8/2015 |
| JP | 6509856 B2 | | 5/2019 |
| KR | 1999-0074442 A | | 10/1999 |
| KR | 10-2008-0015164 A | | 2/2008 |
| KR | 100886570 B1 | * | 3/2009 |
| KR | 10-2009-0095334 A | | 9/2009 |
| KR | 10-2009-0095794 A | | 9/2009 |
| KR | 20090095334 A | * | 9/2009 |
| KR | 10-2011-0103079 A | | 9/2011 |
| KR | 10-1268294 B1 | | 5/2013 |
| KR | 10-2015-0061996 A | | 6/2015 |
| KR | 101618296 B1 | * | 10/2015 |
| KR | 10-2016-0051037 A | | 5/2016 |
| KR | 10-1618296 B1 | | 5/2016 |
| WO | WO2018/124532 A2 | | 7/2018 |

OTHER PUBLICATIONS

Modified translation KR100886570B1 as taught by Gon (Year: 2009).*
Modified translation KR20150118781 as taught by Park (Year: 2015).*
International Search Report for PCT/KR2020/010297 (PCT/ISA/210) dated Dec. 3, 2020.
Extended European Search Report for European Application No. 20853683.9, dated Apr. 4, 2022.

* cited by examiner

[FIG. 1]
RELATED ART
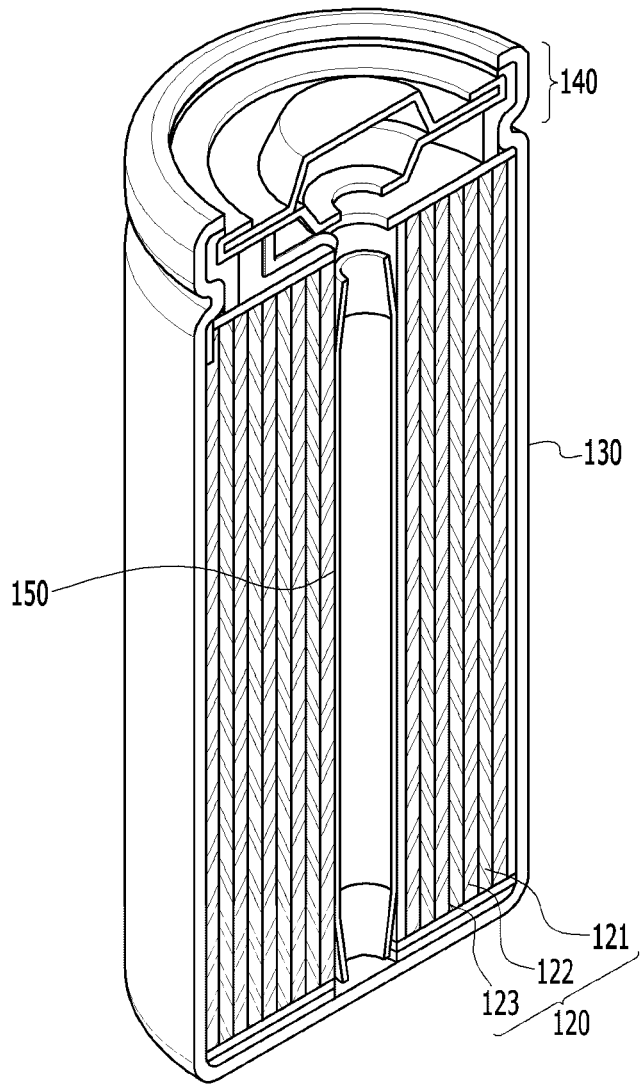

[FIG. 2]
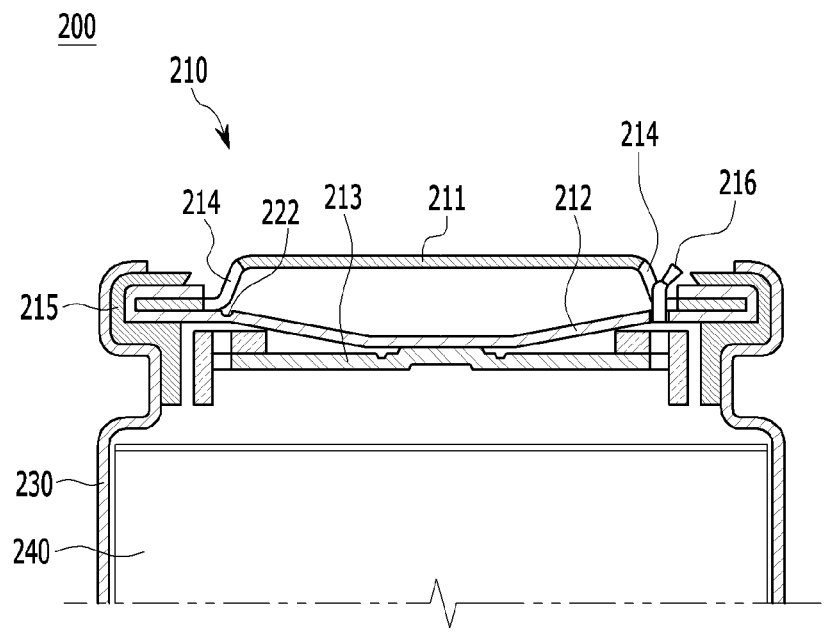
[FIG. 3]
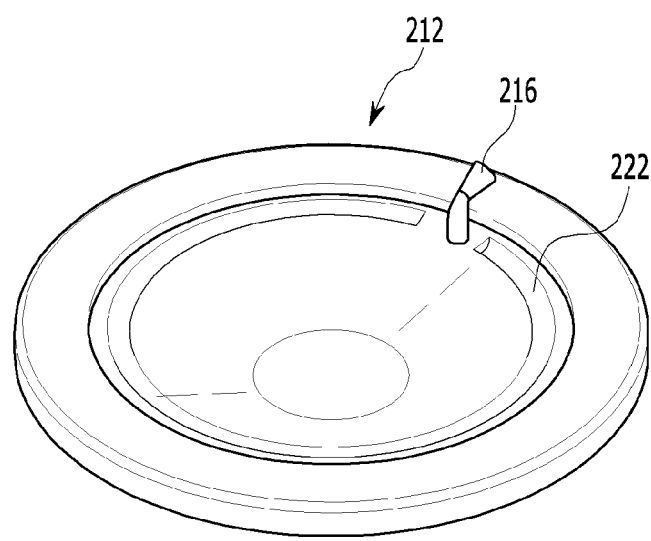

[FIG. 4]
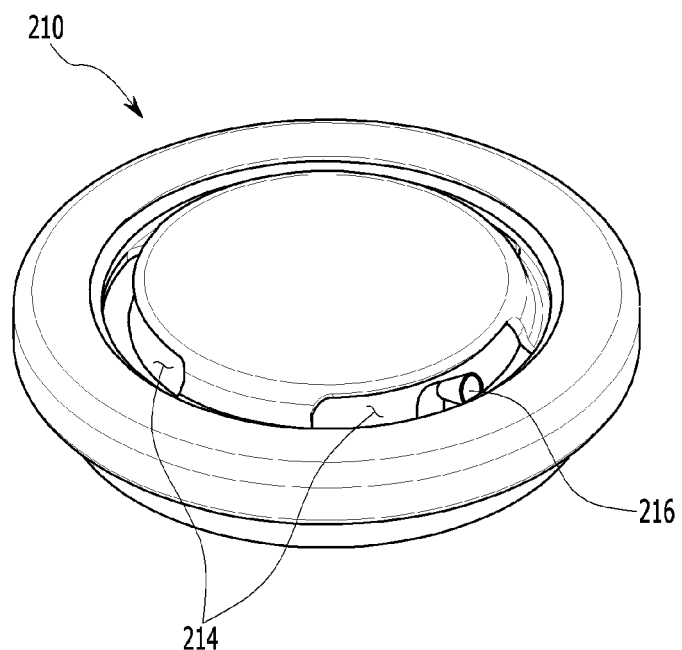

[FIG. 5]
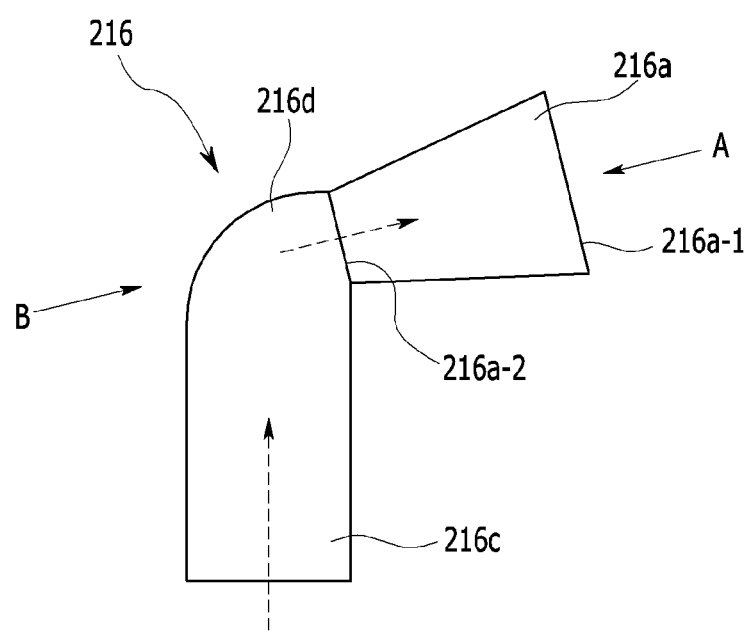

[FIG. 6]
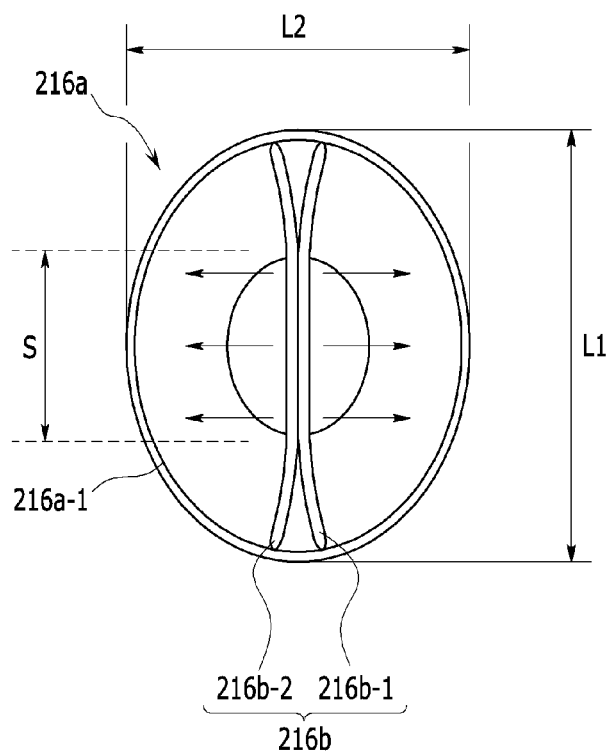

[FIG. 7]
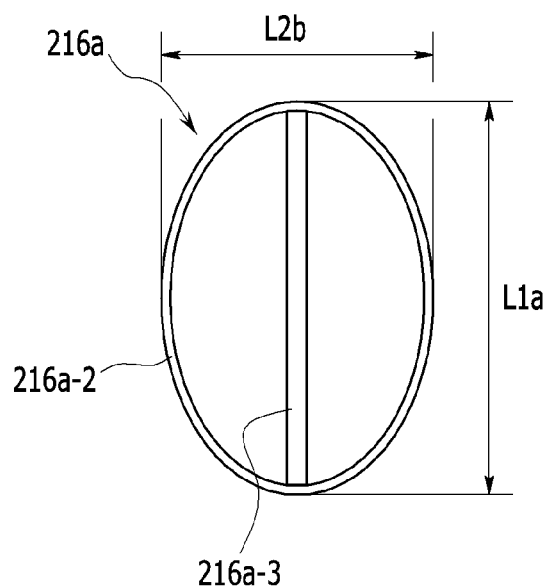
[FIG. 8]
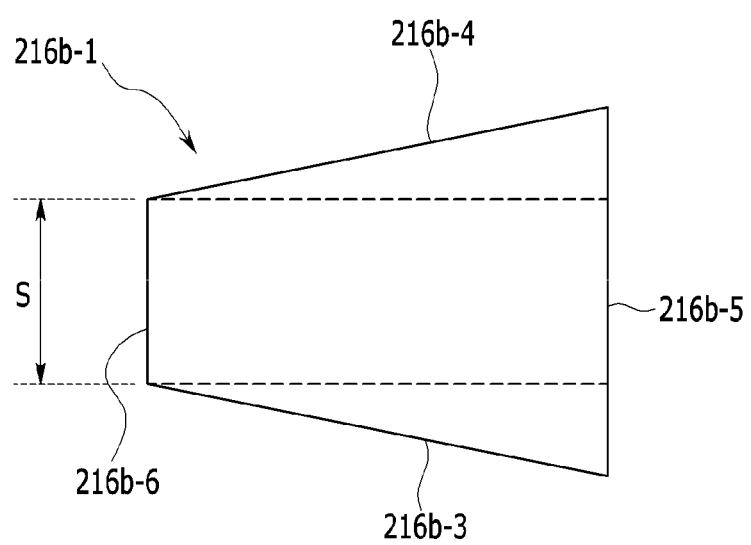

[FIG. 9]
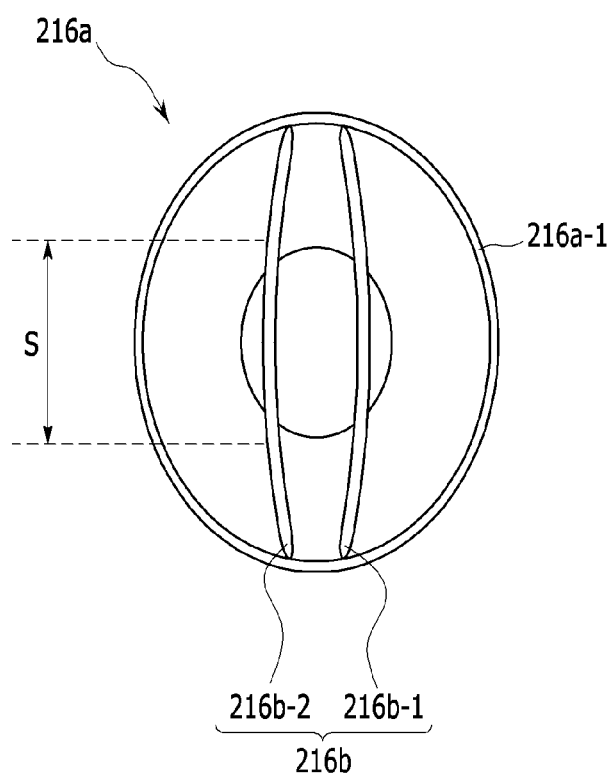

[FIG. 10]
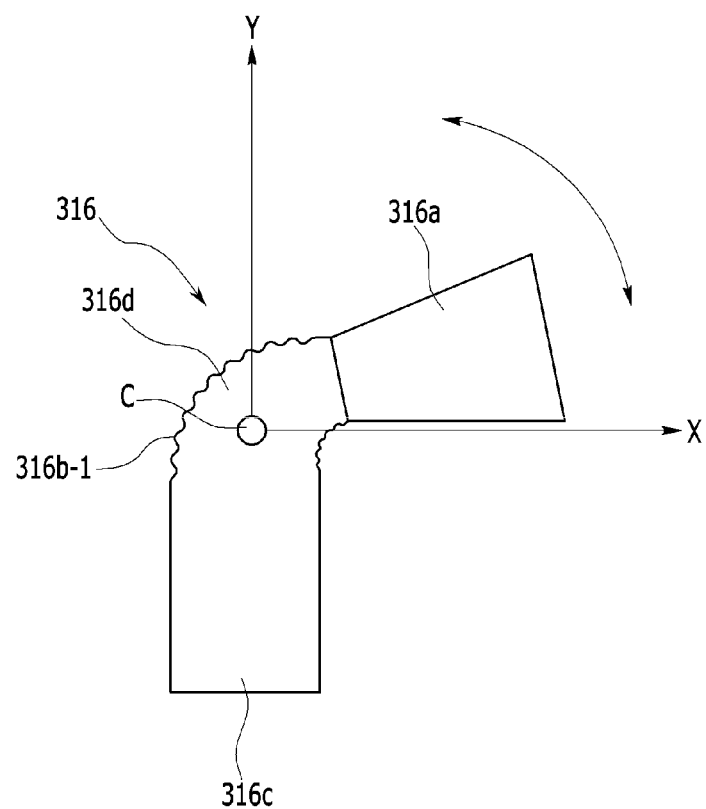

[FIG. 11]
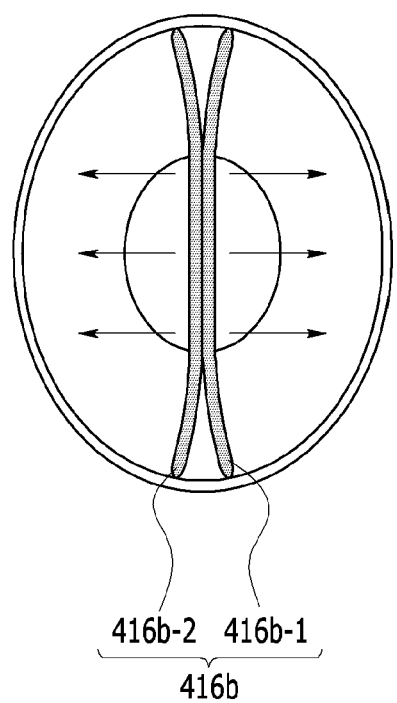

CYLINDRICAL BATTERY

CROSS CITATION WITH RELATED APPLICATION(S)

This application claims the benefit of Korean Patent Application No. 10-2019-0100469 filed on Aug. 16, 2019 with the Korean Intellectual Property Office, the disclosure of which is incorporated herein by reference in its entirety.

TECHNICAL FIELD

The present disclosure relates to a cylindrical battery.

BACKGROUND ART

As energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, the demand for batteries as energy sources is rapidly increasing as mobile device technology continues to develop and the demand for such mobile devices continues to increase. Accordingly, much research on batteries capable of satisfying various needs has been carried out. In particular, in terms of the material for batteries, the demand for lithium secondary batteries, such as lithium ion batteries and lithium ion polymer batteries, which have advantages such as high energy density, discharge voltage, and output stability, is very high.

Secondary batteries may be classified based on the structure of an electrode assembly, in which a positive electrode, a negative electrode, and a separator interposed between the positive electrode and the negative electrode are stacked. For example, the electrode assembly may include a jelly-roll (wound) type structure in which a long sheet type positive electrode and a long sheet type negative electrode are wound in the state in which a separator is disposed between the positive electrode and the negative electrode, or a stacked (laminated) type structure in which pluralities of positive electrodes and negative electrodes, which are cut into predetermined unit sizes, are sequentially stacked in a state where separators are disposed therebetween. Recently, in order to solve the problems of the jelly-roll type electrode assembly and the stack type electrode assembly, there has been developed a stacked/folded type electrode assembly having an improved structure, which is a combination of the jelly-roll type electrode assembly and the stacked type electrode assembly. The stacked/folded type electrode assembly has a structure in which unit cells stacked with certain units of the positive electrodes and the negative electrodes are sequentially wound with a separation film and so on while a separator is interposed therebetween.

These electrode assemblies are mounted in a pouch case, a cylindrical can, a prismatic case, and the like depending on the purpose of use to produce a battery.

Among them, the cylindrical battery has the advantages of being easy to manufacture and having a high energy density per weight, and thus, is used as an energy source for various devices ranging from portable computers to electric vehicles.

FIG. 1 is a cross-sectional schematic diagram illustrating a cylindrical battery according to the related art.

Referring to FIG. 1, the cylindrical battery 100 is manufactured by receiving a jelly-roll type electrode assembly 120 in a cylindrical case 130, injecting an electrolyte into the cylindrical case 130, and coupling a top cap 140 to an opened upper end of the cylindrical case 130.

The jelly-roll type electrode assembly 120 has a structure, in which a positive electrode 121, a negative electrode 122, and a separator 123 are stacked to be wound in a round shape, and a cylindrical center pin 150 is inserted into a central portion of the electrode assembly 120, which is a winding core. The center pin 150 functions to fix and support the electrode assembly 120, and also functions as a passage for discharging gas generated during charging and discharging.

The conventional cylindrical battery 100, which has been finished through the process, undergoes an activating process. At this time, the gas generated in the interior of the cylindrical battery 100 increases an internal pressure of the cylindrical battery 100 to cause a safety problem and also to reduce a performance and a lifetime of the cylindrical battery 100. However, the conventional cylindrical battery 100 is structurally not capable of removing the gas generated in the process of activation.

DETAILED DESCRIPTION OF THE INVENTION

Technical Problem

It is an object of the present disclosure to provide a cylindrical battery which can remove an internal gas generated in a process of activating a cylindrical battery, thereby improving the performance of the battery and also prolonging the lifetime of the battery.

However, the problem to be solved by the embodiments of the present disclosure is not limited to the above-described problems, and can be variously expanded within the scope of the technical idea included in the present disclosure.

Technical Solution

A cylindrical battery according to an embodiment of the present disclosure, includes a metal can, an electrode assembly mounted in the metal can, a top cap closing an upper end of the metal can, the top cap including an exhaust hole, a safety vent located at an upper end of the electrode assembly, and a gas discharge member provided in the safety vent, in which the gas discharge member may include a thin film part having at least two thin films.

The gas discharge member may further include a discharge part, a connection part, and a bending part.

The thin film part may include a first thin film and a second thin film.

The first thin film and the second thin film may face each other, and may make contact with each other in a central region.

The first thin film and the second thin film may be separated from each other in a vacuum state.

The first thin film and the second thin film may each have an arch shape.

The first thin film and the second thin film may each be composed of a metal material.

The first thin film and the second thin film may each be arranged along a long axis of the discharge part.

The first thin film and the second thin film may be connected to an inner surface of the discharge part.

The first thin film and the second thin film may each be composed of a shape memory alloy.

The shape memory alloy may be a titanium nickel alloy.

The gas discharge member may be formed at a periphery of the safety vent at which the top cap and the safety vent make contact with each other.

The gas discharge member may be located at a portion of the top cap at which the exhaust hole is formed.

A first side of the discharge part may be connected to the bending part, and a second side of the discharge part opposite the first side may have an open structure.

A slot-shaped gas inlet may be formed on one side of the discharge part.

A wrinkle may be formed in the bending part.

The discharge part may be bent in an X-axis, Y-axis, and Z-axis directions.

Advantageous Effects

As set forth above, a cylindrical battery according to the embodiments of the present disclosure can remove an internal gas generated in a process of activating a cylindrical battery, thereby improving the performance of the battery and also prolonging the lifetime of the battery.

BRIEF DESCRIPTION OF THE DRAWINGS

FIG. 1 is a cross-sectional schematic diagram illustrating a cylindrical battery according to the related art;

FIG. 2 is a cross-sectional schematic diagram illustrating a cylindrical battery according to an embodiment of the present disclosure;

FIG. 3 is a schematic diagram illustrating a safety vent of FIG. 2;

FIG. 4 is a schematic diagram illustrating a cap assembly of FIG. 2;

FIG. 5 are a side schematic diagram illustrating a gas discharge member of FIG. 2;

FIG. 6 is a front schematic diagram when the discharge part of FIG. 5 is viewed from a direction A;

FIG. 7 is a front schematic diagram when the discharge part of FIG. 5 is viewed from a direction B;

FIG. 8 is a side schematic diagram illustrating a thin film part of FIG. 6;

FIG. 9 is a front schematic diagram illustrating a state in which a first thin film and a second thin film of FIG. 6 are separated from each other; and, FIGS. 10 and 11 are schematic diagrams illustrating another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

FIG. 2 is a cross-sectional schematic diagram illustrating a cylindrical battery according to an embodiment of the present disclosure.

Referring to FIG. 2, the cylindrical battery 200 has a structure in which a jelly-roll type electrode assembly 240 is inserted into the interior of a metal can 230 and a cap assembly 210 is mounted on an opened upper end of the metal can 230. The cap assembly 210 may include a top cap 211, a safety vent 212, a current interruptive member 213, a gasket 215, and a gas discharge member 216.

The top cap 211 may have a structure in which a positive electrode terminal is formed to protrude to the outside of the cylindrical battery 200 and an exhaust hole 214 is punched. The top cap 211 may be electrically connected to the safety vent 212 along a periphery of the safety vent 212.

The safety vent 212 may have a predetermined notch 222 formed therein so as to be burst by a high-pressure gas generated in an interior of the cylindrical battery 200. The safety vent 212 maintains a downward protruding structure when the cylindrical battery 200 is normally operated. However, when the internal pressure of the gas to increase to exceed a normal range due to the gas generated in the interior of the cylindrical battery 200, the safety vent 212 may protrude upwards to be burst and thus the internal gas may be discharged.

In the cylindrical battery 200 according to the present disclosure, a separate gas discharge member 216 may be formed in the safety vent 212. A detailed structure of the gas discharge member 216 will be described below.

The current interruptive member 213 may interrupt current to relieve internal pressure when the cylindrical battery 200 abnormally operates. The current interruptive member 213 may be mounted in a space between the electrode assembly 240 and the safety vent 212.

The gasket 215 may be mounted at the periphery of the top cap 211 to electrically insulate the top cap 211 acting as the positive electrode terminal and the metal can 230 acting as the negative electrode terminal.

FIG. 3 is a schematic diagram illustrating a safety vent of FIG. 2.

Referring to FIGS. 2 and 3, the gas discharge member 216 that may discharge the internal gas, may be formed in the safety vent 212. The location of the gas discharge member 216 is not particularly limited, but may be formed at a periphery of the safety vent 212, which makes contact with the top cap 211. The periphery of the safety vent 212, in which the top cap 211 and the safety vent 212 make contact with each other, may be a space for securing a support force by which the gas discharge member 216 may be stably fixed.

Further, when an operator connects an external device to the gas discharge member 216 to discharge the internal gas, structural deformation can be minimized, and thus it is preferable that the gas discharge member 216 is formed at the periphery of the safety vent 212, at which the top cap 211 and the safety vent 212 make contact with each other.

Further, it is preferable that the gas discharge member 216 is located at a portion at which the notch is not formed.

FIG. 4 is a schematic diagram illustrating a cap assembly of FIG. 2.

Referring to FIGS. 2 and 4, the gas discharge member 216 may be located at the portion at which the exhaust hole 214 is formed, so that the location of the gas discharge member 216 can be visible by naked eyes.

Meanwhile, it is preferable that the gas discharge member 216 is formed lower than the height of the top cap 211 acting as the positive electrode terminal not to interfere electrical connection of the top cap 211 and an external connection terminal (not illustrated).

FIG. 5 is a side schematic diagram illustrating a gas discharge member of FIG. 2. FIG. 6 is a front schematic diagram when the discharge part of FIG. 5 is viewed from a direction A. FIG. 7 is a front schematic diagram when the discharge part of FIG. 5 is viewed from a direction B.

Referring to FIGS. 5 to 7, the gas discharge member 216 may include a discharge part 216a, a thin film part 216b, a connection part 216c, and a bending part 216d.

The shape of the discharge part 216a is not particularly limited, but may be a cup shape having an elliptical cross-section as an example. Further, a long axis L1 and a short axis L2 of one side 216a-1 of the discharge part 216a may be formed longer than a long axis L1a and a short axis L2b of an opposite side 216a-2 thereof, respectively.

The one side 216a-2 of the discharge part 216a may be connected to the bending part 216d, and the opposite side 216a-1 of the discharge part 216a may have an opened structure. The one side 216a-2 of the discharge part 216a has a closed structure like a bottom surface of a cup, but a gas inlet 216a-3 of a slot shape may be formed along the long axis L1a.

Due to the structure, the connection part 216c, the bending part 216d, and the discharge part 216a may be fluidly communicated with each other, and the internal gas generated in a process for activating the cylindrical battery 200 may be discharged to the outside along a dotted line arrow of FIG. 5.

The shape of the connection part 216c is not particularly limited, but may be a cylindrical shape as an example. A material of the connection part 216c is not also particularly limited, but may be a metal such as aluminum A1050 or a titanium nickel alloy.

The bending part 216d connects the connection part 216c and the discharge part 216a. The shape of the bending part 216d is not particularly limited if the discharge part 216a has a structure that is bent at a predetermined angle with respect to the connection part 216c. A material of the bending part 216d is also not particularly limited, but may be a metal such as aluminum A1050 or a titanium nickel alloy.

FIG. 8 is a side schematic diagram illustrating a thin film part of FIG. 6.

Referring to FIGS. 6 and 8, the thin film part 216b may be formed in an interior space of the discharge part 216a. The thin film part 216b may include a first thin film 216b-1 and a second thin film 216b-2. The first thin film 216b-1 and the second thin film 216b-2 may be arranged in a long axis L1 of the discharge part 216a, and the first thin film 216b-1 and the second thin film 216b-2 may have a structure, in which they make contact with each other in a central region S while facing each other. The internal gas is not discharged in a state in which the first thin film 216b-1 and the second thin film 216b-2 make contact with each other in a central region S.

The shapes of the first thin film 216b-1 and the second thin film 216b-2 are not particularly limited, but may be an arch shape as an example. Further, the shape of the first thin film 216b-1 may be the same as the shape of the second thin film 216b-2. A side shape of the first thin film 216b-1 may be a trapezoidal shape that is symmetrical with respect to the central region S. A first edge 216b-3 and a second edge 216b-4 may be connected to an inner surface of the discharge part 216a. A third edge 216b-5 and a fourth edge 216b-6 may be formed in parallel to each other. The fourth edge 216b-6 may have the same length as the length of the central region S.

The first thin film 216b-1 and the second thin film 216b-2 may be connected to an inner surface of the discharge part 216a while being separated from each other at the peripheries thereof except for the central region S.

FIG. 9 is a front schematic diagram illustrating a state in which the first thin film and the second thin film of FIG. 6 are separated from each other.

Referring to FIGS. 6 and 9, an external device (not illustrated) capable of applying a vacuum state may be connected to the one side 216a-1 of the discharge part 216a. If the vacuum state is formed in the discharge part 216a, a space into which the internal gas may be discharged like the central region S of FIG. 9 while the first thin film 216b-1 and the second thin film 216-2 are separated from each other in a direction of a solid arrow of FIG. 6 in the central portion S. The internal gas may be discharged to the outside through the space.

The thicknesses of the first thin film 216b-1 and the second thin film 216b-2 are not particularly limited, but may be 0.001 mm to 0.01 mm.

A material of the first thin film 216b-1 and the second thin film 216b-2 are also not particularly limited, but may be a metal such as aluminum A1050 or a titanium nickel alloy.

FIG. 10 is a side schematic diagram illustrating another embodiment of the present disclosure.

Referring to FIG. 10, the gas discharge member 316 may include a discharge part 316a, a thin film part (not illustrated), a connection part 316c, and a bending part 316d. The bending part 316d may be a connection pipe having wrinkles 316d-1. Accordingly, the discharge part 316a may be easily bent in the X-axis, Y-axis, and Z-axis directions. For reference, the Z-axis is not illustrated, but is an axis that is perpendicular to the X-axis and the Y-axis, passes through C, and is formed in a direction facing FIG. 10.

An operator may easily connect an external device to the discharge part 316a through the structure.

FIG. 11 is a front schematic diagram illustrating another embodiment of the present disclosure.

Referring to FIG. 11, the thin film part 416b may include a first thin film 416b-1 and a second thin film 416b-2, which are composed of a shape memory alloy such as a titanium nickel alloy. The first thin film 416b-1 and the second thin film 416b-2 may be deformed in a specific temperature range and may be separated from each other in a direction of a solid arrow. For example, the first thin film 416b-1 and the second thin film 416b-2 may be a structure of being separated from each other at a temperature of 120° C. or more.

Through the structure, not only it is possible to prevent explosion due to the high pressure in the interior of the battery but also an internal gas can be discharged without using an external device.

Based on the above disclosure, this is to be understood by those of ordinary skill in the art that various applications and modifications can be made within the scope of the present disclosure.

The invention claimed is:
1. A cylindrical battery, comprising:
a metal can;
an electrode assembly mounted in the metal can;
a top cap closing an upper end of the metal can, the top cap having an exhaust hole;
a safety vent located at an upper end of the electrode assembly; and a gas discharge member provided in the safety vent, the gas discharge member comprising a thin film part having at least two thin films, wherein the gas discharge member is formed at a periphery of the safety vent at which the top cap and the safety vent make contact with each other.

2. The cylindrical battery of claim 1, wherein the gas discharge member further comprises a discharge part, a connection part, and a bending part.

3. The cylindrical battery of claim 2, wherein the thin film part comprises a first thin film and a second thin film.

4. The cylindrical battery of claim 3, wherein the first thin film and the second thin film face each other, and are configured to make contact with each other in a central region.

5. The cylindrical battery of claim 4, wherein the first thin film and the second thin film are configured to be separated from each other in a vacuum state.

6. The cylindrical battery of claim 3, wherein each of the first thin film and the second thin film has an arch shape.

7. The cylindrical battery of claim 3, wherein each of the first thin film and the second thin film is composed of a metal material.

8. The cylindrical battery of claim 3, wherein the first thin film and the second thin film are oriented along a long axis of the discharge part.

9. The cylindrical battery of claim 3, wherein the first thin film and the second thin film are connected to an inner surface of the discharge part.

10. The cylindrical battery of claim 3, wherein each of the first thin film and the second thin film is composed of a shape memory alloy.

11. The cylindrical battery of claim 10, wherein the shape memory alloy is a titanium nickel alloy.

12. The cylindrical battery of claim 1, wherein the gas discharge member is located at a portion of the top cap at which the exhaust hole is formed.

13. The cylindrical battery of claim 2, wherein a first side of the discharge part is connected to the bending part, and a second side of the discharge part opposite the first side has an open structure.

14. The cylindrical battery of claim 2, wherein a slot-shaped gas inlet is formed on one side of the discharge part.

15. The cylindrical battery of claim 2, wherein a wrinkle is formed in the bending part.

16. The cylindrical battery of claim 13, wherein the discharge part is configured to bent in an X-axis, Y-axis, and Z-axis directions.

* * * * *